United States Patent
de Lang

[15] 3,635,552
[45] Jan. 18, 1972

[54] OPTICAL INTERFEROMETER

[72] Inventor: Hendrik de Lang, Emmasingel, Eindhoven, Netherlands

[73] Assignee: U.S. Philips Corporation, New York, N.Y.

[22] Filed: Apr. 14, 1970

[21] Appl. No.: 28,195

Related U.S. Application Data

[63] Continuation of Ser. No. 595,712, Nov. 21, 1966, abandoned.

[30] Foreign Application Priority Data

Nov. 24, 1965 Netherlands..........................6515207

[52] U.S. Cl..............................356/106, 356/109, 350/112
[51] Int. Cl..........................................G01b 9/02, G02b 21/06
[58] Field of Search...........................356/106–113; 350/12

[56] References Cited

UNITED STATES PATENTS

| | | | |
|---|---|---|---|
| 2,924,142 | 2/1960 | Normarski | 350/13 |
| 3,146,294 | 8/1964 | Koester et al. | 356/107 |
| 3,409,375 | 11/1968 | Hubbard | 356/106 |

FOREIGN PATENTS OR APPLICATIONS

| | | | |
|---|---|---|---|
| 639,014 | 6/1950 | Great Britain | 350/12 |
| 710,495 | 6/1954 | Great Britain | 350/12 |

Primary Examiner—Ronald L. Wibert
Assistant Examiner—T. Major
Attorney—Frank R. Trifari

[57] ABSTRACT

An interferometer employing a beam splitter, and means for circularly polarizing the split beams into mutually opposite directions. The circularly polarized beams are redirected to an analyzer, preferably rotational, to generate a phase interference pattern which is detected by photodetection devices.

8 Claims, 5 Drawing Figures

PATENTED JAN 18 1972
3,635,552
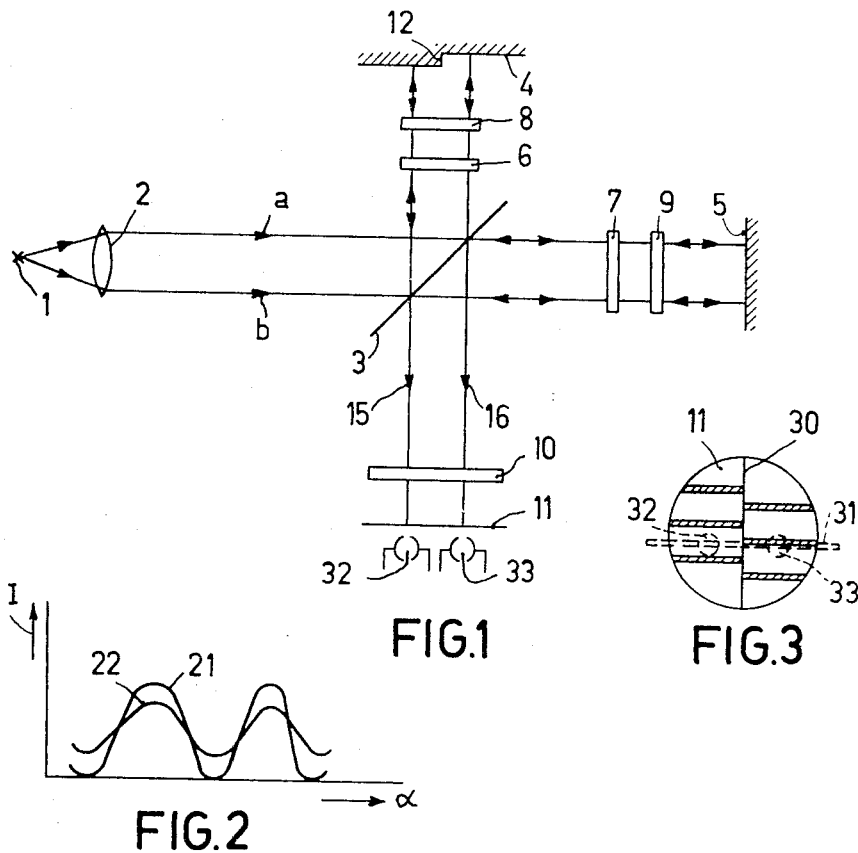
FIG.1
FIG.3
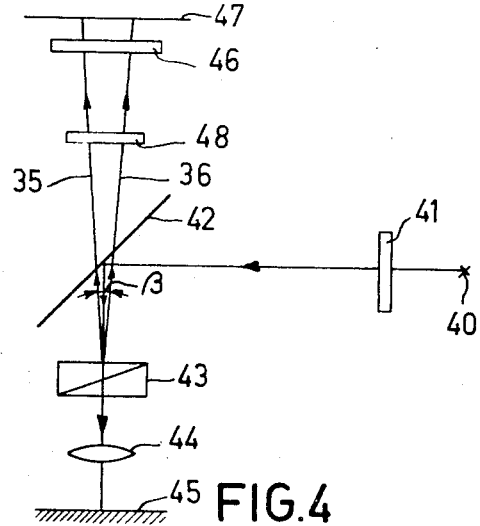
FIG.2
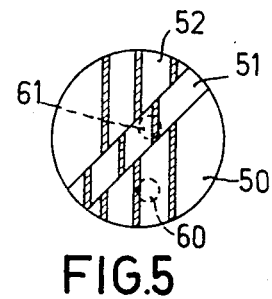
FIG.5
FIG.4
INVENTOR.
HENDRIK DE LANG
BY
Frank R. Trifari
AGENT

OPTICAL INTERFEROMETER

This application is a continuation of Ser. No. 595,712 filed Nov. 21, 1966 and now abandoned.

This invention relates to optical interferometers including an optical element dividing the radiation beam from a source into spatially separate partial beams, in which at least one partial beam is reflected by, or passes through, the object to be tested and then the partial beams are set to interference.

One of the interferometers of the above-mentioned kind is known as the Michelson interferometer. In this interferometer one partial beam is reflected, after having passed through the semipermeable dividing mirror, by a reference mirror and the other partial beam is reflected, after reflection by the dividing mirror, by the object to be tested. Images of the two reflected partial beams are produced via the dividing mirror in the image field.

If the difference between the optical paths of the partial beams is zero or equal to an even number of half wavelengths, the two beams are intensified. If the difference between the paths is equal to an odd number of half wavelengths, extinction occurs. When the object to be tested is displaced in the direction of the beam incident on it, the displacement may be calculated from the number of intensity variations in the image field if the wavelength of the radiation is known.

If the object to be tested has a certain depth, that is to say if the wave front of the partial beam does not coincide with the reflecting surface of the object to be tested, the intensity of radiation in the image field is not constant since the partial beams reflected by the various parts of the object to be tested have paths of different lengths. It is thus possible to determine the depth of the object to be tested.

In practice, the relevant partial beam does not perpendicularly strike the reflecting object to be tested, but the plane transverse to the direction of propagation of the partial beam is at a small angle with the reflecting surface of the object. As a result, parallel strips of minimum and maximum intensities of radiation occur in the image field. If an abrupt change of thickness occurs in the object to be tested, the image of this change forms a fault line: the strips on one side of this line are shifted relative to the corresponding strips on the other side. The magnitude of the shift in turn is a measure of the change of thickness.

Another interferometer of the above-mentioned kind is an interference microscope in which the two interfering partial beams are polarized at right angles to one another, that is to say the plane of the direction of oscillation of one radiation beam is at right angles to that of the other radiation beam.

In this interference microscope, the radiation originating from a radiation source first passes through a polarizer which converts the beam into linearly polarized light. After reflection by a semipermeable dividing mirror which is struck at an angle of 45°, the linearly polarized beam impinges on the object which likewise reflects the beam. A birefractive prism is arranged in the path of radiation between the object and the semipermeable dividing mirror.

The linearly polarized beam of radiation is divided into two beams in the prism. The direction of oscillation of one beam is at right angles to that of the other beam. The two linearly polarized beams of radiation emerging from the crystal, for example, a Wollaston prism, are at small angle with one another. An analyzer is arranged in the light path between the prism and the image field and allows analyzer, of only the components of the beams which oscillate in the direction of oscillation of shown converts analyzer.

Due to the difference between the optical paths of the two beams passing through the analyzer the image field exhibits areas, more particularly parallel strips, of maximum and minimum intensities of radiation.

Known interferometers have the disadvantage of being unsuitable for measurements of phase differences which vary in time comparatively rapidly. In fact, the measurements consist in a number of adjustments, for example of brightness patterns, which have to take place successively in time.

The present invention has for its purpose to obviate this disadvantage and, to this end, is characterized in that the partial beams are converted into beams circularly polarized in opposite senses by means of polarization-optical expedients, a linear polarizer being arranged in the path of the recombined partial beams.

In an optical interferometer according to the invention in which the partial beams are polarized at right angles to one another, the polarization-optical expedients are preferably formed by an $(n/4)\lambda$-plate ($n$=odd) in diagonal position.

The invention underlies recognition of the fact that the phase difference between the partial right angles may be continuously varied by polarization-optical expedients without variation in the geometrical lengths of path of the beams.

In order that the invention may be readily be carried into effect, it will now be described in detail, by way of example, with reference to the accompanying diagrammatic drawings, in which:

FIG. 1 shows a first embodiment of an interferometer according to the invention;

FIGS. 2 and 3 show diagram which serve to explain the operation of the interferometer of FIG. 1;

FIG. 4 shows a second embodiment of an interferometer according to the invention; and FIG. 5 shows a diagram to explain the operation of the interferometer of FIG. 4.

In the interferometer of FIG. 1, a parallel light beam produced by a light source 1 arranged in the focal plane of a lens 2 strikes a semipermeable dividing mirror 3 at an angle of 45°. Of the light beam only the rays indicated by $a$ and $b$ are shown for the sake of simplicity. The semipermeable mirror 3 transmits, apart from the losses, one half of the incident beam to a reference mirror 5 and reflects the other half to an object 4 to be tested which is, for example, a mirror having a locally thicker portion.

The beams reflected by the mirrors 4 and 5, after having been transmitted and reflected, respectively, by the semipermeable mirror 3, are observed in an image field 11.

According to the invention a ¼$\lambda$-plate 6 and a linear polarizer 8 are arranged in the light path between the mirrors 3 and 4 and a ¼$\lambda$-plate 7 and a linear polarizer 9 are arranged in the light path between the mirrors 3 and 5.

The partial beams, which consist of natural light, are converted into linearly polarized light in the polarizers 8 and 9 respectively. After reflection by the mirrors 4 and 5 respectively, this linearly polarized light is converted into circularly polarized light by the $\lambda/4$-plates 6 and 7 respectively. In fact, by suitable choice of the positions of the $\lambda/4$-plates the main directions of these plates are at an angle of 45° with the direction of polarization of the associated polarizers.

Furthermore, the direction of the optical axes of the crystal plates 6 and 7 are chosen so that the light emerging from one plate is circularly polarized in the clockwise direction and the light emerging from the other plate is circularly polarized in the counter clockwise direction.

If the two circularly polarized oscillations have the same amplitude, they combine into one linear oscillation which impinges upon analyzer 10. The intensity of the transmitted component varies sinusoidally with the angle made by the main direction of the analyzer 10 and the direction of polarization of the linearly polarized beam. The modulation depth of the transmitted radiation is 100 percent since the transmitted intensity is zero at an angle of 90° between the main direction and the direction of polarization.

If the circularly polarized oscillations have different amplitudes, they combine into an elliptical oscillation. The long axis of the ellipse has the direction of the linear oscillation in the case just described. This means that the modulation depth of the radiation transmitted by the analyzer 10 varies. However, the phase difference between the oscillation and the angular position of the analyzer remains the same as in the case first described.

In FIG. 2, the reference numerals 21 and 22 indicate the intensities I of the transmitted beam as a function of the angular position α of the analyzer for the same amplitudes and different amplitudes, respectively, of the circularly polarized radiations striking the analyzer.

The interferometer is adjusted so that a stripe pattern is produced in the image field 11. The stripe pattern is produced by turning the reference mirror 5 or the object 4 through a small angle. The stripe pattern is shifted on each side of a line 30 (FIG. 3). The line 30 is adjusted transversely to the stripes. This is affected, for example, by turning the object 4 about an axis parallel to the incident beam of radiation.

The shift of the stripe pattern is caused by the difference in height of the layer on the object 4 at point 12 (FIG. 1).

When the analyzer 10 rotates about an axis parallel to the incident beam, the stripe patterns on each side of the boundary line 30 are shifted in a direction parallel to the boundary line.

Behind the analyzer 10, a slit 31 is provided in parallel with the stripe pattern. Each half of the field of view is reproduced on separate photoelectric detectors 32 and 33, positioned proximate said image field respectively. When the analyzer 10 rotates uniformly, electric signals are produced in the detectors 32 and 33 having a phase difference equal to the optical phase difference between the beams 15 and 16. This phase difference is electrically measured in known manner.

A similar result would be obtained if, instead of rotating the analyzer, the mirror 4 or 5 would be moved in the direction of the beams. However, in the latter case, unsurmountable practical difficulties are involved, since it is substantially impossible for the mirrors to be displaced in parallel with themselves with the desired accuracy.

In one embodiment the source 1 was a monochromatic light source emitting light having a wavelength of 5,460 Angstroms. The analyzer 10 was rotated at a velocity of 1,500 r.p.m. A phase difference of approximately 4° between the sinusoidal signals produced by the detectors 32 and 33 can still be detected. The difference height 12 corresponding to this phase difference was 0.003 microns.

In the interferometer shown in FIG. 4, the light from a light source 40 passes through a lens system (not shown) which throws a parallel beam onto a polarizer 41 which converts the beam into linearly polarized light. After reflection on a semipermeable mirror 42 which is struck at an angle of 45° the linearly polarized beam impinges on an object 45 which again reflects the beam to the semipermeable mirror 42. A lens system 44 ensures that an image of the object 45 is produced in an image field 47. In a birefractive prism 43 through which both the forward beam and the reflected, linearly polarized beam pass, this beam is divided into two spatially separate beams. The direction of oscillation of one linearly polarized beam is at right angles to that of the other linearly polarized beam. The angle β made by the beams after their second passage through the prism 43 is approximately 0.5°.

The said spatially separate beams pass through the semipermeable mirror 42 and strike an analyzer 46. Due to the difference between the optical paths of the two beams, parallel stripes of maximum and minimum intensities of radiation occur in the image field 47.

When the object 45 is formed by two reflective layers having a difference in height Δh, so that the object surfaces is divided into two fields, the image field is divided into three fields 50, 51 and 52 by the crystal 43 (FIG. 5). The stripe patterns in the field 50 and 52 bare actually parts of one pattern. The field 51 has a pattern of the same periodicity as that of the fields 50 and 52. However, the pattern in the field 51 is shifted relative to that in the fields 50 and 52. See the article in "Revue de Metallurgie" 52, No. 2, 1955, pages 121 to 134, especially FIGS. 1, 2 and 3 and the associated description.

According to the invention a λ/4-plate is arranged between the semipermeable mirror 42 and the analyzer 46 in diagonal position relative to the main directions of the prism 43. The two linearly polarized beams 35 and 36 are converted by a λ/4-plate 48 into two circularly polarized beams having opposite senses of rotation, since the direction of oscillation of the linear beams are at right-angles to one another.

When the analyzer 46 is rotated about an axis transverse to the main direction, the stripe patterns in the fields 50, 51 and 52 commence to shift in a direction at right angles to the direction of the stripes in a similar manner as in the interferometer of FIG. 1. Electric signals having a phase difference equal to the optical phase difference between the beams 35 and 36 are produced in detectors 60 and 61 placed in the image field behind the slit. As before, the said phase difference is electrically measured in known manner.

What is claimed is:

1. An optical interferometer including an object surface and a reference surface for measuring object displacement comprising, a source of light, first optical means arranged in the optical path of said source of light for dividing said light into first and second spatially separate partial beams, one of said partial beams striking the surface of said object and being reflected therefrom the other of said beams striking said reference surface and reflecting therefrom, second optical means arranged in the path of each of said partial beams for converting said beams into linearly polarized light prior to striking the respective surfaces, third optical means in the path of each of said reflected partial beams for converting said linearly polarized light into circularly polarized light, each of said beams being circularly polarized in mutually opposite senses of rotation, each of said partial beams after said conversion into circularly polarized light striking said first optical means and thereby being recombined into one linear oscillation having a split field pattern of two component beams impinging upon an analyzer positioned in the path of said recombined beam in front of said object image field, said analyzer rotating uniformly relative to said split field pattern to produce a first and second signal having a phase difference equal to the optical phase difference between said two component beams, and first and second photo detection means positioned in respective ones of said split field on the side of said analyzer opposite the side upon which said two component beams are incident and proximate said image field for electrically detecting said phase difference.

2. The combination of claim 1 wherein said first optical means is a semipermeable mirror.

3. The combination of claim 1 wherein said second optical means is a linear polarized position in the path of said first and second partial beams.

4. The combination of claim 2 wherein said third optical means is a $(n/4)\lambda$ plate (n=odd) positioned in the path of said first and second partial beams, each $(n/4)\lambda$ plate set with their main directions at a diagonal with the direction of polarization of the polarizer associated therewith.

5. An optical interferometer for measuring object displacement comprising a source of light, first optical means arranged in the optical path of said source of light for providing a first linearly polarized beam of light, a semipermeable mirror in the path of said linearly polarized beam for reflecting said beam to a second optical means positioned in the path of said first linearly polarized beam of light, the path of said linearly polarized beam of light thereafter terminating at said object and reflecting therefrom back through said second optical means and said mirror, said second optical means dividing said beam into first and second spatially separate beams having respective directions of oscillation at right angles to each other, third optical means positioned in the path of said first and second beams between said second optical means and the image field of said object for converting said two spatially separate linearly polarized beams into two circularly polarized beams having mutually opposite senses of rotation, said two circularly polarized beams together providing a split field impinging upon an analyzer, said analyzer positioned in the path of said beams before said image field and rotating with respect to and about an axis parallel to the common incidence of said counterrotating beams, first and second detectors each positioned in a respective one of said split field and substantially coincident with said field and having produced therein electric signals, having a phase difference equal to the optical phase difference between the said partial beams, produced by said rotating analyzer.

6. The combination of claim 5 wherein said second optical means is a birefringent prism.

7. THe combination of claim 5 wherein said third optical means is a λ/4 plate.

8. An optical interferometric system including a source of light, a reflective object surface and an image field corresponding to said object surface comprising a first beam of natural light generated by said light source, first optical means for converting said beam into first and second beams of linearly polarized light each directed at a reflecting surface, at least one of said beams striking said object surface, second optical means in the path of and responsive to said reflected first and second beams for converting said first and second beams of linearly polarized light into third and fourth beams each circularly polarized with opposite senses of rotation, a rotating analyzer positioned in the path of said third and fourth beams between said second optical means and said image field, said third and fourth beams providing a split field pattern, said analyzer rotating uniformly relative to said split field pattern to produce a first and second signal having a phase difference equal to the optical phase differences between said third and fourth beams, and first and second photodetection means positioned in respective ones of said split fields on the side of said analyzer opposite the side upon which said third and fourth beams are incident and proximate said image field for electrically detecting said phase difference.

* * * * *

PO-1050
(5/69)

UNITED STATES PATENT OFFICE
CERTIFICATE OF CORRECTION

Patent No. 3635552            Dated January 18, 1972

Inventor(s) HENDRIK DE LANG

It is certified that error appears in the above-identified patent and that said Letters Patent are hereby corrected as shown below:

Column 1, line 64, cancel "analyzer" and insert --passage--.
             line 66, cancel "shown converts" and insert --the--.
    Column 2, line 10, "(n/4)" should be --n/4--.
    Column 3, line 65, "bare" should be --are--.

Claim 1, line 7, after "therefrom" insert --,--.
            line 25, "field" should be --fields--.
    Claim 3, line 2, cancel "polarized position" and insert --polarizer positioned--.
    Claim 5, line 22, "counterrotating" should be --counter rotating--.
    Claim 7, line 1, "THe" should be --The--.

Signed and sealed this 26th day of September 1972.

(SEAL)
Attest:

EDWARD M. FLETCHER, JR.            ROBERT GOTTSCHALK
Attesting Officer                   Commissioner of Patents